(12) United States Patent
Bhattiprolu et al.

(10) Patent No.: US 10,810,122 B2
(45) Date of Patent: Oct. 20, 2020

(54) DYNAMIC I/O TRANSLATION TABLE ALLOCATION FOR SINGLE ROOT INPUT OUTPUT VIRTUALIZATION ENABLED I/O ADAPTERS

(71) Applicant: International Business Machines Corporation, Armonk, NY (US)

(72) Inventors: Swathi M. Bhattiprolu, Hyderabad (IN); Charles S. Graham, Rochester, MN (US); Travis J. Pizel, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 16/204,736

(22) Filed: Nov. 29, 2018

(65) Prior Publication Data

US 2020/0174923 A1    Jun. 4, 2020

(51) Int. Cl.
*G06F 12/02* (2006.01)
*G06F 12/1009* (2016.01)
(Continued)

(52) U.S. Cl.
CPC ...... *G06F 12/0292* (2013.01); *G06F 9/45558* (2013.01); *G06F 12/1009* (2013.01);
(Continued)

(58) Field of Classification Search
CPC .............. G06F 1/00–3296; G06F 3/00; G06F 3/06–0689; G06F 5/00–16;
(Continued)

(56) References Cited

U.S. PATENT DOCUMENTS 7,076,634 B2    7/2006 Lambeth et al.
8,375,148 B2 *  2/2013 Watanabe ........... G06F 9/45558
                                                    710/8
(Continued)

OTHER PUBLICATIONS

J. Suzuki, Y. Hidaka, J. Higuchi, T. Baba, N. Kami and T. Yoshikawa, "Multi-root Share of Single-Root I/O Virtualization (SrR-IOV) Compliant PCI Express Device," 2010 18th IEEE Symposium on High Performance Interconnects, Mountain View, CA, 2010, pp. 25-31 (Year: 2010).*

(Continued)

*Primary Examiner* — Daniel C. Chappell
(74) *Attorney, Agent, or Firm* — Peter J. Edwards

(57) ABSTRACT

Dynamic I/O translation table allocation for SR-IOV enabled I/O adapters including receiving an instruction to transition the SR-IOV adapter to shared mode; determining, using a configuration file for the SR-IOV adapter, memory requirements for an I/O translation table; comparing the memory requirements for the I/O translation table to memory currently allocated for use by the SR-IOV adapter; based on the comparing the memory requirements for the I/O translation table to the memory currently allocated for use by the SR-IOV adapter, determining that the memory currently allocated for use by the SR-IOV adapter is insufficient to store the I/O translation table and determining an additional amount of memory required to store the I/O translation table; and allocating, at runtime, the additional amount of memory for storing the I/O translation table.

20 Claims, 6 Drawing Sheets

(51) Int. Cl.
*G06F 13/16* (2006.01)
*G06F 9/455* (2018.01)

(52) U.S. Cl.
CPC .......... *G06F 13/1668* (2013.01); *G06F 2009/45583* (2013.01); *G06F 2212/1016* (2013.01); *G06F 2212/1044* (2013.01); *G06F 2212/657* (2013.01)

(58) Field of Classification Search
CPC .......... G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | |
|---|---|---|---|
| 8,386,679 B2 | 2/2013 | Nordstrom et al. | |
| 8,495,274 B2 | 7/2013 | Brownlow et al. | |
| 8,561,065 B2* | 10/2013 | Cunningham | G06F 9/45558 718/1 |
| 8,561,066 B2* | 10/2013 | Koch | G06F 9/45558 718/1 |
| 8,954,704 B2 | 2/2015 | Cardona et al. | |
| 9,092,297 B2* | 7/2015 | Armstrong | G06F 11/20 |
| 9,092,365 B2 | 7/2015 | King et al. | |
| 9,104,600 B2 | 8/2015 | King et al. | |
| 9,146,863 B2 | 9/2015 | Brownlow et al. | |
| 9,330,037 B2 | 5/2016 | Guttahalli Krishna et al. | |
| 9,355,052 B2 | 5/2016 | Guttahalli Krishna et al. | |
| 9,384,060 B2* | 7/2016 | Hunter | G06F 9/5077 |
| 9,710,395 B1 | 7/2017 | Garibay et al. | |
| 2010/0228945 A1 | 9/2010 | Deshpande et al. | |
| 2012/0265916 A1* | 10/2012 | Nordstrom | G06F 13/28 710/308 |
| 2015/0058596 A1* | 2/2015 | King | G06F 12/1081 711/206 |
| 2015/0067224 A1 | 3/2015 | Arroyo et al. | |
| 2015/0127871 A1 | 5/2015 | Desai | |
| 2016/0077884 A1* | 3/2016 | Hunter | G06F 9/5077 718/104 |
| 2018/0113813 A1 | 4/2018 | Garibay et al. | |
| 2019/0266117 A1* | 8/2019 | Duncan | G06F 13/24 |

OTHER PUBLICATIONS

Disclosed Anonymously, *Method and system for efficient page table allocation*, ip.com Disclosure No. IPCOM000238062D, Jul. 30, 2014.

Disclosed Anonymously, *Method and System for Direct Memory Access (DMA) to a Logical Partition Memory*, ip.com Disclosure No. IPCOM000196520D, Jun. 4, 2010.

IBM, *Self Tuning Firmware Algorithm for Allocation of I/O Address Translation Tables*, ip.com Disclosure No. IPCOM000022478D, Mar. 17, 2004.

U.S. Appl. No. 15/953,226, to Victor A. Garibay et al., entitled, *Dynamic Address Translation Table Allocation*, assigned to International Business Machines Corporation, 21 pages, filed Apr. 13, 2018.

Appendix P; List of IBM Patent or Applications Treated as Related, Nov. 29, 2018, 2 pages.

* cited by examiner

DYNAMIC I/O TRANSLATION TABLE ALLOCATION FOR SINGLE ROOT INPUT OUTPUT VIRTUALIZATION ENABLED I/O ADAPTERS

BACKGROUND

Field of the Invention

The field of the invention is data processing, or, more specifically, methods, apparatus, and products for dynamic I/O translation table allocation for Single Root Input Output Virtualization enabled I/O adapters.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for dynamic I/O translation table allocation for Single Root Input Output Virtualization (SR-IOV) enabled I/O adapters are disclosed in this specification. Dynamic I/O translation table allocation for SR-IOV enabled I/O adapters includes receiving an instruction to transition the SR-IOV adapter to shared mode, wherein the SR-IOV in shared mode provides, to multiple logical partitions, access to the SR-IOV adapter; determining, using a configuration file for the SR-IOV adapter, memory requirements for an I/O translation table for use by the SR-IOV adapter in shared mode; comparing the memory requirements for the I/O translation table to memory currently allocated for use by the SR-IOV adapter; based on the comparing the memory requirements for the I/O translation table to the memory currently allocated for use by the SR-IOV adapter, determining that the memory currently allocated for use by the SR-IOV adapter is insufficient to store the I/O translation table and determining an additional amount of memory required to store the I/O translation table; and allocating, at runtime, the additional amount of memory for storing the I/O translation table.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
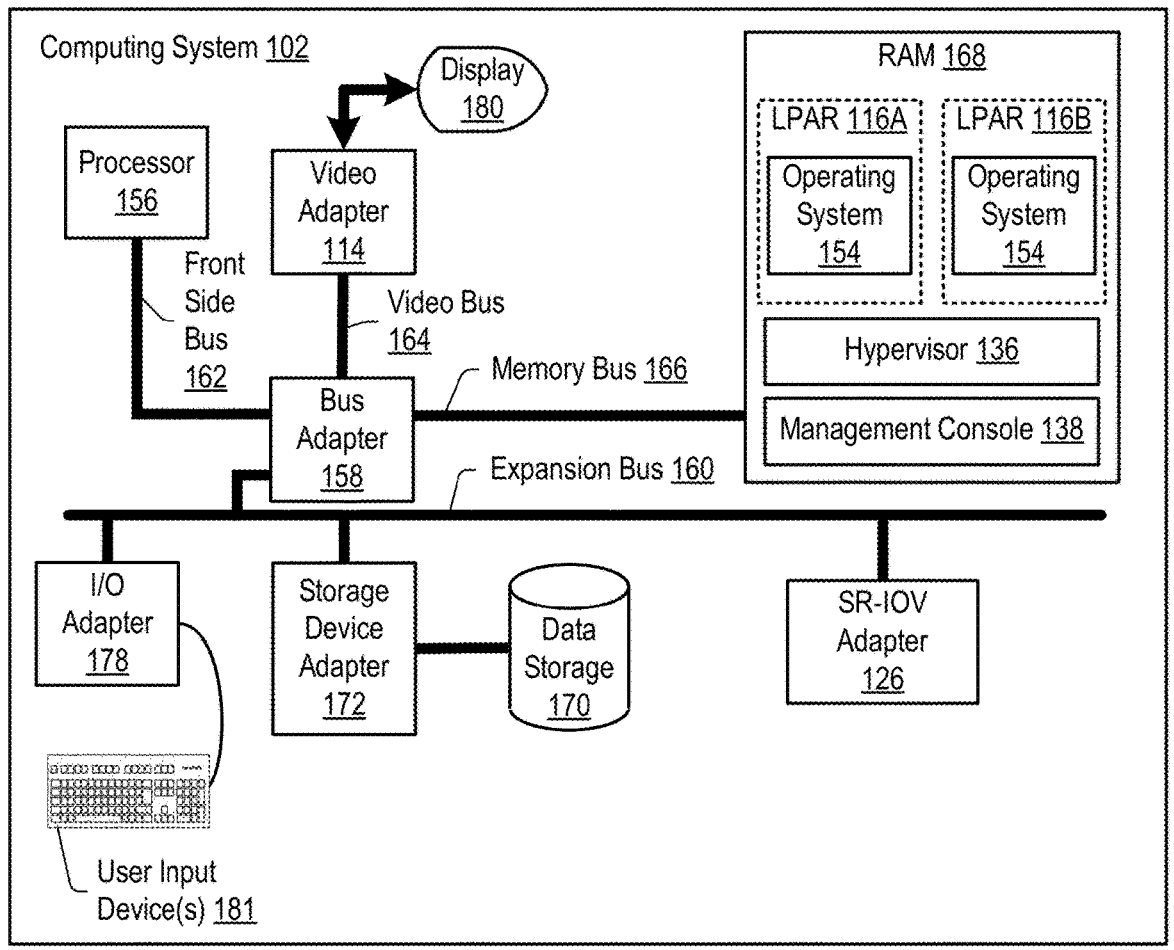
FIG. 1 sets forth a block diagram of an example system configured for dynamic I/O translation table allocation for Single Root Input Output Virtualization (SR-IOV) enabled I/O adapters according to embodiments of the present invention.

Exemplary methods, apparatus, and products for dynamically bypassing a peripheral component interconnect (PCI) switch in accordance with the present invention are described with reference to the accompanying drawings, beginning with FIG. 1. FIG. 1 sets forth a network diagram of a system configured for dynamically bypassing a PCI switch according to embodiments of the present invention. The example environment of FIG. 1 includes a computing system (102). Such a computing system (102) may provide clients on host devices (external to the computing system (102)) with virtualization services for enabling various cloud related product offerings.

The example computing system (102) of FIG. 1 includes at least one computer processor (156) or "CPU" as well as random access memory (168) or "RAM," which is connected through a high speed memory bus (166) and bus adapter (158) to processor (156) and to other components of the computing system (102).

Stored in RAM (168) is a hypervisor (136) and a management console (138). The management console (138) may provide a user interface through which a user may direct the hypervisor (136) on instantiating and maintaining multiple logical partitions (logical partition A (116A), logical partition B (116B)), where each logical partition may provide virtualization services to one or more clients. The management console (138) may also provide a user interface through which a user may direct the hypervisor (136) to switch a Single Root Input Output Virtualization (SR-IOV) adapter from dedicated mode to shared mode.

Also stored in RAM (168) are two instances of an operating system (154), one for each logical partition (logical partition A (116A), logical partition B (116B)). Operating systems useful in computers configured for firmware management of SR-IOV adapters according to various embodiments include UNIX™, Linux™, Microsoft Windows™, AIX™, IBM's i™ operating system, and others as will occur to those of skill in the art. The operating systems (154), hypervisor (136), and management console (138) are shown in RAM (168), but many components of such software may typically be stored in non-volatile memory such as, for example, on a data storage (170) device or in firmware (132).

The computing system (102) may also include a storage device adapter (172) coupled through expansion bus (160) and bus adapter (158) to processor (156) and other components of the computing system (102). Storage device adapter (172) connects non-volatile data storage to the computing system (102) in the form of data storage (170). Storage device adapters useful in computers configured for dynamically bypassing a PCI switch according to various embodiments include Integrated Drive Electronics ("IDE") adapters, Small Computing system Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computing system (102) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computing system (102) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The expansion bus (160) shown in FIG. 1 also includes a SR-IOV adapter (126). SR-IOV is an extension to the PCIe specification. The SR-IOV adapter (126) allows a device, such as a network adapter, to separate access to its resources among various PCIe hardware functions. These functions consist of the following types: A PCIe physical function and a PCIe virtual function. The physical function advertises the device's SR-IOV capabilities. Each virtual function is associated with a device's physical function. A virtual function shares one or more physical resources of the device, such as a memory and a network port, with the physical function and other virtual functions on the device. From the perspective of a logical partition (logical partition A (116A), logical partition B (116B)) instantiated by a hypervisor (136), a virtual function appears as a fully functional physical PCIe adapter. In this way, a single physical adapter may be 'shared' amongst many logical partitions or multiple virtual functions may be instantiated for use by a single logical partition. Although referred to as a 'virtual' function, readers of skill in the art will recognize that a virtual function is in fact a physical channel that is not a resource virtualized entirely by the hypervisor.

The SR-IOV adapter (126) may operate in one of two modes. In a dedicated mode, the SR-IOV adapter (126) may be assigned for use by a single entity, such as a single logical partition. In shared mode, the SR-IOV adapter (126) may be assigned for use by multiple entities, such as multiple logical partitions (logical partition A (116A), logical partition B (116B)). Using the SR-IOV adapter in shared mode may require a greater number of resources relative to the SR-IOV adapter in dedicated mode. Such resources include memory for I/O translation tables, partitional endpoint (PE) numbers, bus/device/function (BDF) ranges, memory mapping input/output (MMIO) addresses, direct memory access (DMA) addresses, and message signal interrupt (MSI) addresses.

The computing system (102) of FIG. 1 also includes a service processor (not shown). A service processor is a separate, dedicated internal processor typically located on the motherboard of a server, a PCI card, or on the chassis of a blade server or telecommunications platform. The service processor operates independently from the server's CPU and operating system (OS), even if the CPU or OS is locked up or otherwise inaccessible. The service processor may monitor operation of various hardware, software, and firmware resources within the computing system (102) through an out-of-band bus. The service processor may report such monitoring to a system management server through an out-of-band network. The service processor may be coupled to a different power source than other components of the computing system (102) so that the service processor may operate even when the main components of the computing system (102) are powered down.

Figure 2:
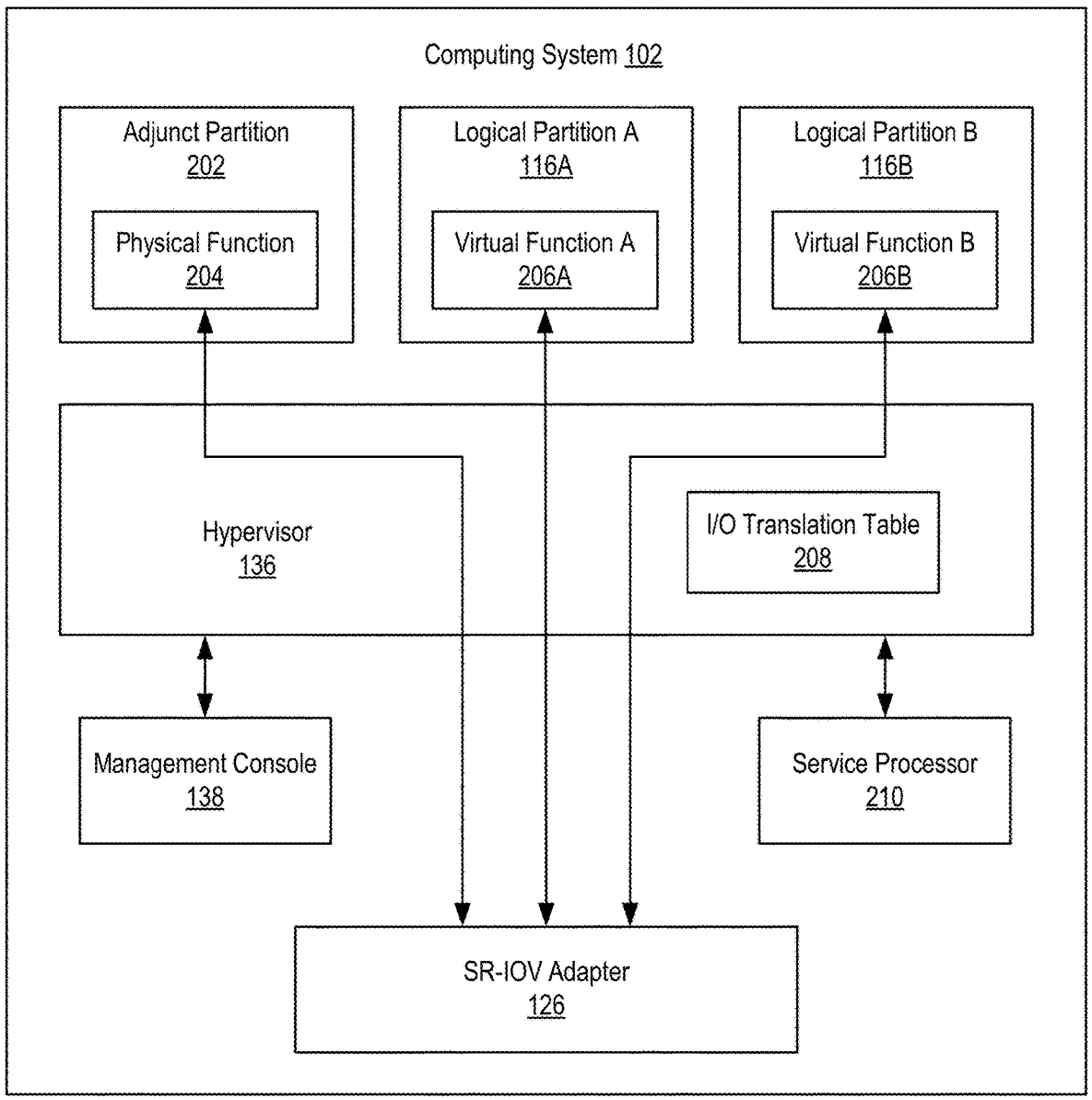
FIG. 2 sets forth a block diagram of an example system configured for dynamic I/O translation table allocation for SR-IOV enabled I/O adapters according to embodiments of the present invention.

FIG. 2 shows an exemplary system for dynamic I/O translation table allocation for Single Root Input Output Virtualization (SR-IOV) enabled I/O adapters according to embodiments of the present invention. As shown in FIG. 2, the exemplary computing system (102) includes an adjunct partition (202) and two logical partitions (logical partition A (116A), logical partition B (116B)) executing on a hypervisor (136). The adjunct partition (202) includes a physical function (204). Each logical partition (logical partition A (116A), logical partition B (116B)) includes a virtual function (virtual function A (206A), virtual function B (206B)). The computing system (102) also includes a management console (138), service processor (210), and a SR-IOV adapter (126). The hypervisor (136) includes an I/O translation table (208).

The computing system (102) of FIG. 2 shows the SR-IOV adapter (126) in shared mode. The SR-IOV adapter (126) is communicatively coupled, via the hypervisor (136), to the physical function (204) of the adjunct partition (202) and the virtual functions (virtual function A (206A), virtual function B (206B)) of the logical partitions (logical partition A (116A), logical partition B (116B)). In shared mode, the SR-IOV adapter (126) provides I/O services (e.g., such as access to a network) to both logical partitions (logical partition A (116A), logical partition B (116B)) via the virtual functions (virtual function A (206A), virtual function B (206B)).

The management console (138) may generate an instruction for the hypervisor (136) to transition the SR-IOV adapter (126) from dedicated mode to shared mode. The instruction may be generated in response to input from a user. The hypervisor (136) may communicate with the service processor (210) to prepare to transition the SR-IOV adapter (126) from dedicated mode to shared mode. Specifically, the hypervisor (136) may request information from the service processor (210) about the resource requirements of the SR-IOV adapter in shared mode. Such resource requirements may be stored in a configuration file for the SR-IOV adapter.

The I/O translation table (208) contains translation control entries used for I/O address protection. The translation control entries are used by each logical partition (logical partition A (116A), logical partition B (116B)) so that the hypervisor (136) may validate the DMA transactions between logical partitions (logical partition A (116A), logical partition B (116B)) and the SR-IOV adapter (126).

The I/O translation table (208) may be stored in memory assigned to the hypervisor (136). When the SR-IOV adapter is in dedicated mode, the amount of memory required for the I/O translation table (208) may be less, or significantly less, than the amount of memory required for the I/O translation table when the SR-IOV adapter is in shared mode. Memory reserved and allocated for the I/O translation table (208) at boot time may only be sufficient to store the I/O translation table (208) for the SR-IOV adapter (126) in dedicated mode. If the SR-IOV adapter (126) is to be transitioned from dedicated mode to shared mode during runtime, an additional amount of memory may need to be allocated for use by the hypervisor (136) to store the I/O translation table.

Figure 3:
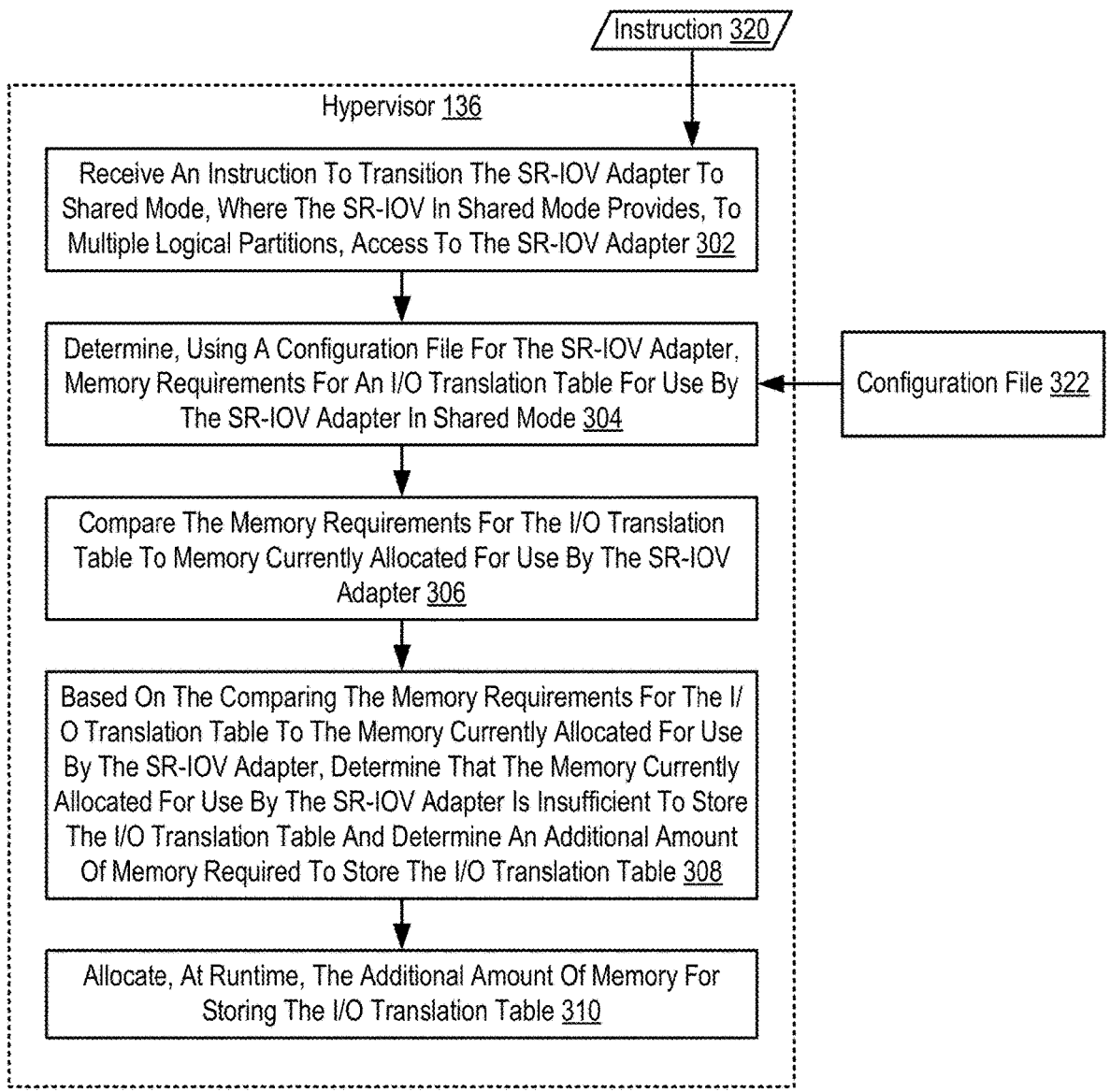
FIG. 3 sets forth a flow chart illustrating an exemplary method for dynamic I/O translation table allocation for SR-IOV enabled I/O adapters according to embodiments of the present invention.

For further explanation, FIG. 3 sets forth a flow chart illustrating an exemplary method for dynamic I/O translation table allocation for Single Root Input Output Virtualization (SR-IOV) enabled I/O adapters according to embodiments of the present invention that includes receiving (302) an instruction (320) to transition the SR-IOV adapter to shared mode, wherein the SR-IOV in shared mode provides, to multiple logical partitions, access to the SR-IOV adapter. Receiving (302) an instruction (320) to transition the SR-IOV adapter to shared mode, wherein the SR-IOV in shared mode provides, to multiple logical partitions, access to the SR-IOV adapter may be carried out by the hypervisor (136) receiving the instruction (320) from a user via a management console. The instruction (320) may be an instruction to transition the SR-IOV adapter from dedicated to shared mode.

The method of FIG. 3 further includes determining (304), using a configuration file (322) for the SR-IOV adapter, memory requirements for an I/O translation table for use by the SR-IOV adapter in shared mode. Determining (304), using a configuration file (322) for the SR-IOV adapter, memory requirements for an I/O translation table for use by the SR-IOV adapter in shared mode may be carried out by the hypervisor (136) retrieving the configuration file and extracting the memory requirements for the I/O translation table for use by the SR-IOV adapter in shared mode.

The configuration file is a data repository that include information about the SR-IOV adapter, including the memory requirements for the I/O translation table used in shared mode. The configuration file may include other information about the SR-IOV adapter, such as memory requirements for the I/O translation table used in dedicated mode, firmware information, and adapter characteristics. The configuration file may be retrieved via a service processor. Specifically, the hypervisor (136) may request the configuration file using an interface with the service processor. The request may include an identifier of the SR-IOV adapter. Alternatively, the configuration file may be retrieved from memory on the SR-IOV adapter itself.

The memory requirements for the I/O translation table used in shared mode may be a static amount of memory, such as 1028 megabytes of memory. Alternatively, the memory requirements for the I/O translation table used in shared mode may be a calculation based on a given configuration of the SR-IOV adapter. For example, the memory requirements for the I/O translation table used in shared mode may be in terms of an amount of memory per virtual function to be assigned.

The method of FIG. 3 further includes comparing (306) the memory requirements for the I/O translation table to memory currently allocated for use by the SR-IOV adapter. Comparing (306) the memory requirements for the I/O translation table to memory currently allocated for use by the SR-IOV adapter may be carried out by the hypervisor (136) determining an amount of available memory currently allocated for the I/O translation table in dedicated mode. The hypervisor may then determine the difference between the memory requirements for the I/O translation table in shared mode and the memory currently allocated for the I/O translation table in dedicated mode, and whether the memory requirements for the I/O translation table in shared mode exceed the memory currently allocated for the I/O translation table in dedicated mode.

The method of FIG. 3 further includes, based on the comparing the memory requirements for the I/O translation table to the memory currently allocated for use by the SR-IOV adapter, determining (308) that the memory currently allocated for use by the SR-IOV adapter is insufficient to store the I/O translation table and determining an additional amount of memory required to store the I/O translation table.

Determining (308) that the memory currently allocated for use by the SR-IOV adapter is insufficient to store the I/O translation table may be carried out by the hypervisor (136) determining that the memory requirements for the I/O translation table in shared mode exceed the memory currently allocated for the I/O translation table in dedicated mode. Determining an additional amount of memory required to store the I/O translation table may be carried out by the hypervisor (136) measuring the difference between the memory requirements for the I/O translation table in shared mode and the memory currently allocated for the I/O translation table in dedicated mode.

For example, the configuration file may indicate that the SR-IOV adapter requires one gigabyte of memory for the I/O translation table in shared mode. The hypervisor (136) may determine that there is only 32 megabytes allocated for the I/O translation table in dedicated mode. The hypervisor compares the memory requirements for the I/O translation table in shared mode and the memory currently allocated for the I/O translation table in dedicated mode and determines that an additional amount of 992 megabytes of memory are required to store the I/O translation table for operating the SR-IOV adapter in shared mode.

The method of FIG. 3 further includes, allocating (310), at runtime, the additional amount of memory for storing the I/O translation table. Allocating (310), at runtime, the additional amount of memory for storing the I/O translation table may be carried out by determining that the additional amount of memory is available from the hypervisor; and allocating, at runtime, memory from the hypervisor for storing the I/O translation table. Allocating (310), at runtime, the additional amount of memory for storing the I/O translation table may also be carried out by determining that the additional amount of memory is unavailable from the hypervisor; determining that the additional amount of memory is available from unallocated system memory; and allocating, at runtime, an amount of memory to the hypervisor to satisfy the additional amount of memory required to store the I/O translation table.

The above-described limitations improve the operation of the computer system by enabling an SR-IOV adapter to uniquely specify, via the configuration file, the memory requirements of the I/O translation table. The above-described limitations also improve the operation of the computer system by allowing for adjustments to the memory requirement after the SR-IOV adapter has been deployed by altering the configuration file to reflect updated memory requirements. Finally, the above-described limitations improve the operation of the computer system by enabling the allocation of memory for the I/O translation table in shared mode only after a transition from dedicated mode, preventing the memory from being underutilized during dedicated mode.

Figure 4:
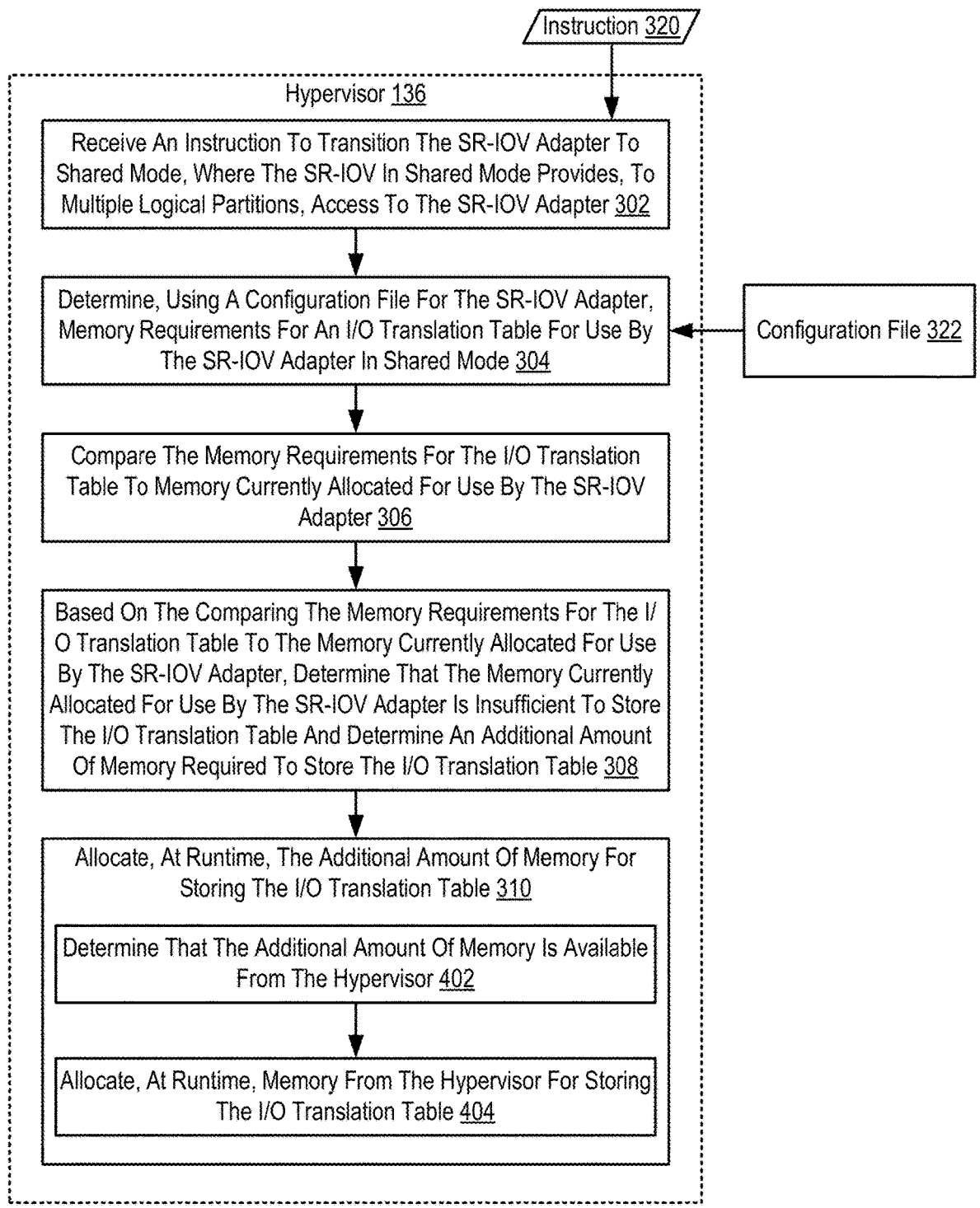
FIG. 4 sets forth a flow chart illustrating an exemplary method for dynamic I/O translation table allocation for SR-IOV enabled I/O adapters according to embodiments of the present invention.

For further explanation, FIG. 4 sets forth a flow chart illustrating a further exemplary method for dynamic I/O translation table allocation for Single Root Input Output Virtualization (SR-IOV) enabled I/O adapters according to embodiments of the present invention that includes receiving (302) an instruction (320) to transition the SR-IOV adapter to shared mode, wherein the SR-IOV in shared mode provides, to multiple logical partitions, access to the SR-IOV adapter; determining (304), using a configuration file (322) for the SR-IOV adapter, memory requirements for an I/O translation table for use by the SR-IOV adapter in shared mode; comparing (306) the memory requirements for the I/O translation table to memory currently allocated for use by the SR-IOV adapter; based on the comparing the memory requirements for the I/O translation table to the memory currently allocated for use by the SR-IOV adapter, determining (308) that the memory currently allocated for use by the SR-IOV adapter is insufficient to store the I/O translation table and determining an additional amount of memory required to store the I/O translation table; and allocating (310), at runtime, the additional amount of memory for storing the I/O translation table.

The method of FIG. 4 differs from the method of FIG. 3, however, in that the method of FIG. 4 further includes determining (402) that the additional amount of memory is available from the hypervisor (136); and allocating (404), at runtime, memory from the hypervisor (136) for storing the I/O translation table. Determining that the additional amount of memory is available from the hypervisor may be carried out by the hypervisor (136) determining an amount of available memory currently assigned to the hypervisor and determining whether the amount of available memory currently assigned to the hypervisor is at least as large as the additional amount of memory required to store the I/O translation table.

Allocating (310), at runtime, memory from the hypervisor for storing the I/O translation table may be carried out by the hypervisor (136) reserving the additional amount of memory required to store the I/O translation table from memory assigned to the hypervisor. The allocation of memory for the I/O translation table is performed at runtime. Allocating the memory at runtime refers to allocating the memory without rebooting, restarting, or otherwise reinitializing the computing system. Allocating (310), at runtime, memory from the hypervisor for storing the I/O translation table may also be carried out by the hypervisor (136) reorganizing memory allocated to itself to ensure that a contiguous range of memory addresses are used for the I/O translation table.

Figure 5:
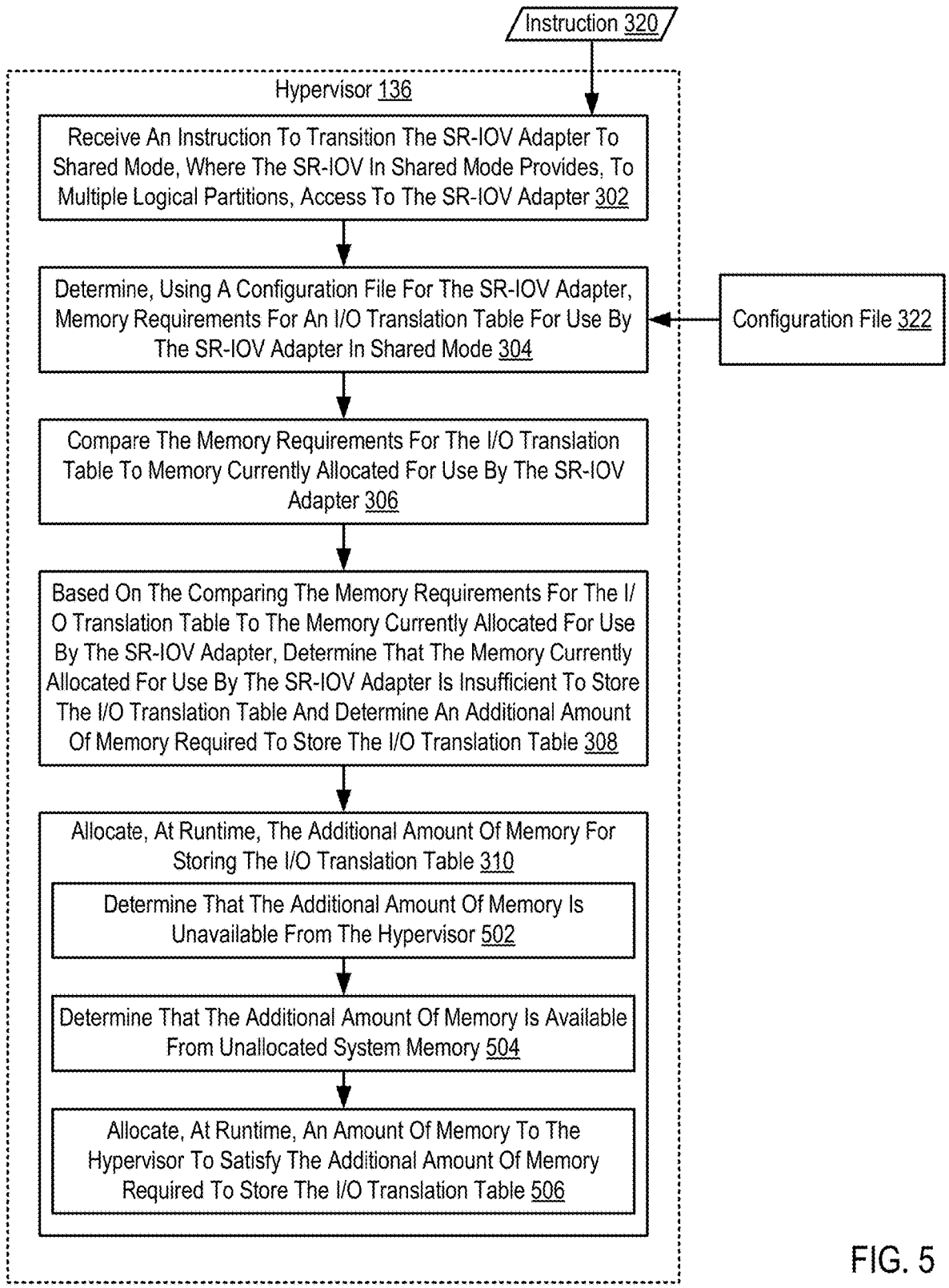
FIG. 5 sets forth a flow chart illustrating an exemplary method for dynamic I/O translation table allocation for SR-IOV enabled I/O adapters according to embodiments of the present invention.

For further explanation, FIG. 5 sets forth a flow chart illustrating a further exemplary method for dynamic I/O translation table allocation for Single Root Input Output Virtualization (SR-IOV) enabled I/O adapters according to embodiments of the present invention that includes receiving (302) an instruction (320) to transition the SR-IOV adapter to shared mode, wherein the SR-IOV in shared mode provides, to multiple logical partitions, access to the SR-IOV adapter; determining (304), using a configuration file (322) for the SR-IOV adapter, memory requirements for an I/O translation table for use by the SR-IOV adapter in shared mode; comparing (306) the memory requirements for the I/O translation table to memory currently allocated for use by the SR-IOV adapter; based on the comparing the memory requirements for the I/O translation table to the memory currently allocated for use by the SR-IOV adapter, determining (308) that the memory currently allocated for use by the SR-IOV adapter is insufficient to store the I/O translation table and determining an additional amount of memory required to store the I/O translation table; and allocating (310), at runtime, the additional amount of memory for storing the I/O translation table.

The method of FIG. 5 differs from the method of FIG. 3, however, in that the method of FIG. 5 further includes determining (502) that the additional amount of memory is unavailable from the hypervisor (136); determining (504) that the additional amount of memory is available from unallocated system memory; and allocating (506), at runtime, an amount of memory to the hypervisor (136) to satisfy the additional amount of memory required to store the I/O translation table.

Determining (502) that the additional amount of memory is unavailable from the hypervisor (136) may be carried out by the hypervisor (136) determining an amount of available memory currently assigned to the hypervisor and determining that the amount of available memory currently assigned to the hypervisor is insufficient to satisfy the additional amount of memory required to store the I/O translation table.

Determining (504) that the additional amount of memory is available from unallocated system memory may be carried out by the hypervisor (136) determining an amount of system memory that is unassigned to either the hypervisor or any logical partition and comparing the unassigned amount of memory to the additional amount of memory required to store the I/O translation table.

Allocating (404), at runtime, an amount of memory to the hypervisor (136) to satisfy the additional amount of memory required to store the I/O translation table may be carried out by the hypervisor (136) adding, to the memory already assigned to the hypervisor (136), an amount of memory sufficient to satisfy the additional amount of memory required to store the I/O translation table.

If the amount of memory necessary to satisfy the additional amount of memory required to store the I/O translation table is not available from either the hypervisor or from unallocated system memory, then the hypervisor may generate an error indication that there is insufficient memory available to transition the SR-IOV adapter to shared mode. Generating an error indicating that there is insufficient memory available to transition the SR-IOV adapter to shared mode may be carried out by the hypervisor (136) creating an error message and informing the user via the management console. The error message may indicate the amount of the memory insufficiency and ways in which the user may free memory for use by the SR-IOV adapter in shared mode.

Figure 6:
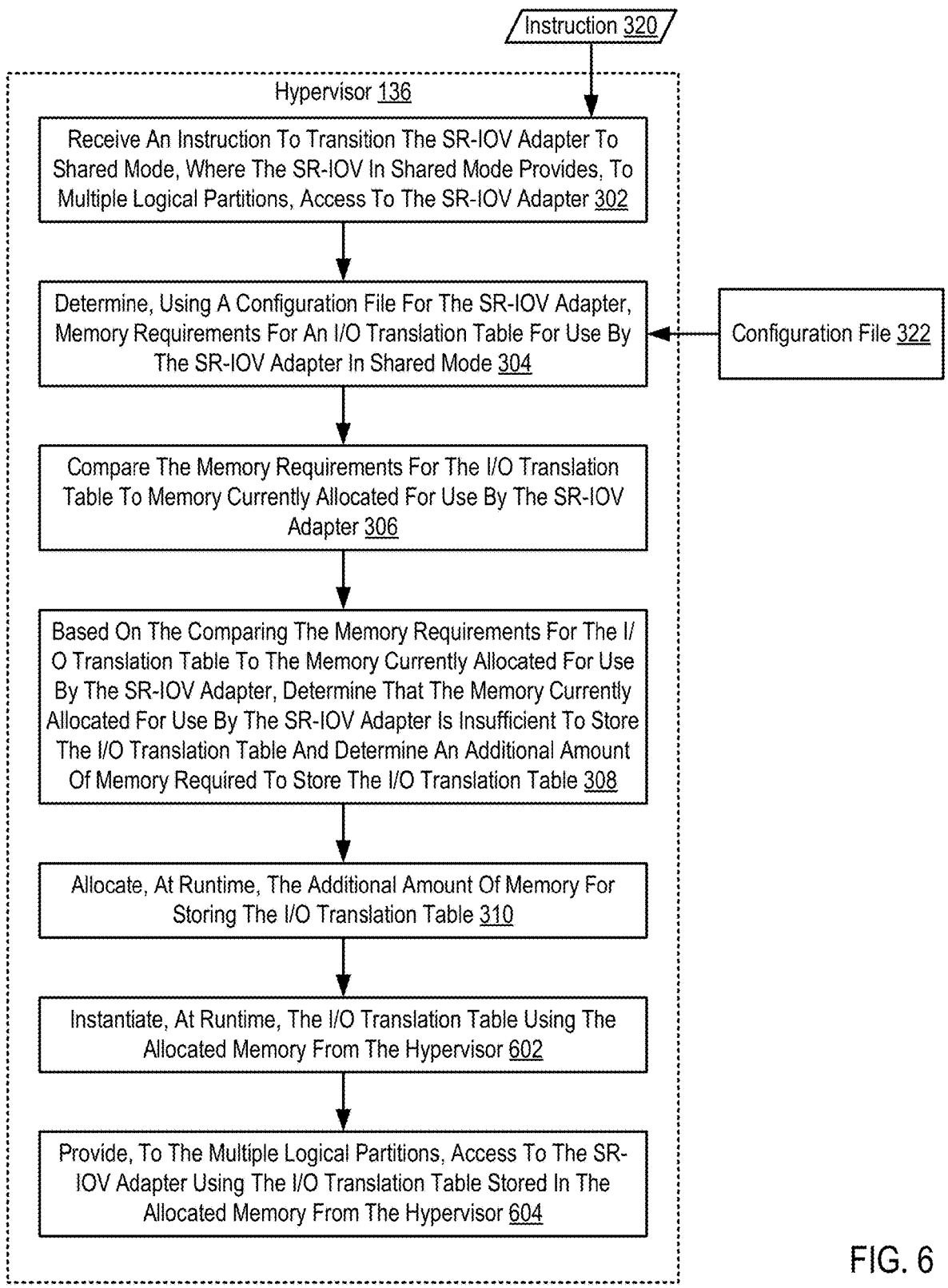
FIG. 6 sets forth a flow chart illustrating an exemplary method for dynamic I/O translation table allocation for SR-IOV enabled I/O adapters according to embodiments of the present invention.

For further explanation, FIG. 6 sets forth a flow chart illustrating a further exemplary method for dynamic I/O translation table allocation for Single Root Input Output Virtualization (SR-IOV) enabled I/O adapters according to embodiments of the present invention that includes receiving (302) an instruction (320) to transition the SR-IOV adapter to shared mode, wherein the SR-IOV in shared mode provides, to multiple logical partitions, access to the SR-IOV adapter; determining (304), using a configuration file (322) for the SR-IOV adapter, memory requirements for an I/O translation table for use by the SR-IOV adapter in shared mode; comparing (306) the memory requirements for the I/O translation table to memory currently allocated for use by the SR-IOV adapter; based on the comparing the memory requirements for the I/O translation table to the memory currently allocated for use by the SR-IOV adapter, determining (308) that the memory currently allocated for use by the SR-IOV adapter is insufficient to store the I/O translation table and determining an additional amount of memory required to store the I/O translation table; and allocating (310), at runtime, the additional amount of memory for storing the I/O translation table.

The method of FIG. 6 differs from the method of FIG. 3, however, in that the method of FIG. 6 further includes instantiating (602), at runtime, the I/O translation table using the allocated memory from the hypervisor; and providing (604), to the multiple logical partitions, access to the SR-IOV adapter using the I/O translation table stored in the allocated memory from the hypervisor.

Instantiating (602), at runtime, the I/O translation table using the allocated memory from the hypervisor may be carried out by the hypervisor (136) creating the I/O translation table using the allocated memory from the hypervisor and preparing the I/O translation table for use by the logical partitions and SR-IOV adapter in shared mode. Instantiating the I/O translation table at runtime refers to instantiating the I/O translation table without rebooting, restarting, or otherwise reinitializing the computing system.

Providing (604), to the multiple logical partitions, access to the SR-IOV adapter using the I/O translation table stored in the allocated memory from the hypervisor may be carried out by the hypervisor (136) transitioning, at runtime, the SR-IOV adapter from dedicated mode to shared mode. Once in shared mode, the multiple logical partitions may utilize the SR-IOV adapter using the virtual functions of each of the multiple logical partitions.

In view of the explanations set forth above, readers will recognize that the benefits of dynamic I/O translation table allocation for SR-IOV enabled I/O adapters according to embodiments of the present invention include:

Improving the operation of a computing system by enabling an SR-IOV adapter to uniquely specify, via the configuration file, the memory requirements of the I/O translation table, increasing computing system utilizing and efficiency.

Improving the operation of a computing system by allowing for adjustments to the requirement after the SR-IOV adapter has been deployed by altering the configuration file to reflect updated requirements, increasing computing system functionality.

Improving the operation of a computing system by enabling the allocation of memory for the I/O translation table in shared mode only after a transition from dedicated mode, preventing the memory from being underutilized during dedicated mode, increasing computing system efficiency.

Exemplary embodiments of the present invention are described largely in the context of a fully functional computer system for dynamic I/O translation table allocation for SR-IOV enabled I/O adapters. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamic I/O translation table allocation for Single Root Input Output Virtualization (SR-IOV) enabled I/O adapters, the method comprising:
   receiving an instruction to transition an SR-IOV adapter to shared mode, wherein the SR-IOV adapter in shared mode provides, to multiple logical partitions, access to the SR-IOV adapter;
   in response to receiving the instruction to transition the SR-IOV adapter to shared mode, determining, using a configuration file for the SR-IOV adapter, an amount of memory that will be required for storing an I/O translation table for use by the SR-IOV adapter after a transition to shared mode, wherein the determining occurs before transitioning the SR-IOV adapter to shared mode;
   comparing the amount of memory that will be required for storing the I/O translation table to a total amount of memory currently allocated for use by the SR-IOV adapter;
   based on the comparing the amount of memory that will be required for storing the I/O translation table to the total amount of memory currently allocated for use by the SR-IOV adapter, determining that the memory currently allocated for use by the SR-IOV adapter is insufficient to store the I/O translation table and determining an additional amount of memory required to store the I/O translation table; and
   allocating, at runtime, the additional amount of memory for storing the I/O translation table.

2. The method of claim 1, wherein allocating, at runtime, the additional amount of memory for storing the I/O translation table comprises:
   determining that the additional amount of memory is available from a hypervisor; and
   allocating, at runtime, memory from the hypervisor for storing the I/O translation table.

3. The method of claim 1, wherein allocating, at runtime, the additional amount of memory for storing the I/O translation table comprises:
   determining that the additional amount of memory is unavailable from a hypervisor;
   determining that the additional amount of memory is available from unallocated system memory; and
   allocating, at runtime, an amount of memory to the hypervisor to satisfy the additional amount of memory required to store the I/O translation table.

4. The method of claim 1, further comprising:
   instantiating, at runtime, the I/O translation table using the allocated memory from a hypervisor; and
   providing, to the multiple logical partitions, access to the SR-IOV adapter using the I/O translation table stored in the allocated memory from the hypervisor.

5. The method of claim 1, wherein receiving the instruction to transition the SR-IOV adapter to shared mode comprises receiving an instruction to transition the SR-IOV adapter from dedicated to shared mode, wherein the SR-IOV adapter in dedicated mode provides, to a single entity, access to the SR-IOV adapter.

6. The method of claim 1, wherein determining, using the configuration file for the SR-IOV adapter, the amount of memory that will be required for storing the I/O translation table comprises retrieving the configuration file via a service processor.

7. The method of claim 1, wherein the I/O translation table is used by a hypervisor to validate direct memory access transactions between a logical partition and the SR-IOV adapter.

8. An apparatus for dynamic I/O translation table allocation for Single Root Input Output Virtualization (SR-IOV) enabled I/O adapters, the apparatus comprising a computer processor, a computer memory operatively coupled to the computer processor, the computer memory having disposed within it computer program instructions that, when executed by the computer processor, cause the apparatus to carry out the steps of:
 receiving an instruction to transition an SR-IOV adapter to shared mode, wherein the SR-IOV adapter in shared mode provides, to multiple logical partitions, access to the SR-IOV adapter;
 in response to receiving the instruction to transition the SR-IOV adapter to shared mode, determining, using a configuration file for the SR-IOV adapter, an amount of memory that will be required for storing an I/O translation table for use by the SR-IOV adapter after a transition to shared mode, wherein the determining occurs before transitioning the SR-IOV adapter to shared mode;
 comparing the amount of memory that will be required for storing the I/O translation table to a total amount of memory currently allocated for use by the SR-IOV adapter;
 based on the comparing the amount of memory that will be required for storing the I/O translation table to the total amount of memory currently allocated for use by the SR-IOV adapter, determining that the memory currently allocated for use by the SR-IOV adapter is insufficient to store the I/O translation table and determining an additional amount of memory required to store the I/O translation table; and
 allocating, at runtime, the additional amount of memory for storing the I/O translation table.

9. The apparatus of claim 8, wherein allocating, at runtime, the additional amount of memory for storing the I/O translation table comprises:
 determining that the additional amount of memory is available from a hypervisor; and
 allocating, at runtime, memory from the hypervisor for storing the I/O translation table.

10. The apparatus of claim 8, wherein allocating, at runtime, the additional amount of memory for storing the I/O translation table comprises:
 determining that the additional amount of memory is unavailable from a hypervisor;
 determining that the additional amount of memory is available from unallocated system memory; and
 allocating, at runtime, an amount of memory to the hypervisor to satisfy the additional amount of memory required to store the I/O translation table.

11. The apparatus of claim 8, wherein the computer program instructions further cause the apparatus to carry out the steps of:
 instantiating, at runtime, the I/O translation table using the allocated memory from a hypervisor; and
 providing, to the multiple logical partitions, access to the SR-IOV adapter using the I/O translation table stored in the allocated memory from the hypervisor.

12. The apparatus of claim 8, wherein receiving the instruction to transition the SR-IOV adapter to shared mode comprises receiving an instruction to transition the SR-IOV adapter from dedicated to shared mode, wherein the SR-TOY adapter in dedicated mode provides, to a single entity, access to the SR-IOV adapter.

13. The apparatus of claim 8, wherein determining, using the configuration file for the SR-IOV adapter, the amount of memory that will be required for storing the I/O translation table comprises retrieving the configuration file via a service processor.

14. The apparatus of claim 8, wherein the I/O translation table is used by a hypervisor to validate direct memory access transactions between a logical partition and the SR-IOV adapter.

15. A computer program product for dynamic I/O translation table allocation for Single Root Input Output Virtualization (SR-IOV) enabled I/O adapters, the computer program product disposed upon a non-transitory computer readable storage medium, the computer program product comprising computer program instructions that, when executed, cause a computer to carry out the steps of:
 receiving an instruction to transition an SR-IOV adapter to shared mode, wherein the SR-IOV adapter in shared mode provides, to multiple logical partitions, access to the SR-IOV adapter;
 in response to receiving the instruction to transition the SR-IOV adapter to shared mode, determining, using a configuration file for the SR-IOV adapter, an amount of memory that will be required for storing an I/O translation table for use by the SR-IOV adapter after a transition to shared mode, wherein the determining occurs before transitioning the SR-IOV adapter to shared mode;
 comparing the amount of memory that will be required for storing the I/O translation table to a total amount of memory currently allocated for use by the SR-IOV adapter;
 based on the comparing the amount of memory that will be required for storing the I/O translation table to the memory currently allocated for use by the SR-IOV adapter, determining that the total amount of memory currently allocated for use by the SR-IOV adapter is insufficient to store the I/O translation table and determining an additional amount of memory required to store the I/O translation table; and
 allocating, at runtime, the additional amount of memory for storing the I/O translation table.

16. The computer program product of claim 15, wherein allocating, at runtime, the additional amount of memory for storing the I/O translation table comprises:
 determining that the additional amount of memory is available from a hypervisor; and
 allocating, at runtime, memory from the hypervisor for storing the I/O translation table.

17. The computer program product of claim 15, wherein allocating, at runtime, the additional amount of memory for storing the I/O translation table comprises:
 determining that the additional amount of memory is unavailable from a hypervisor;
 determining that the additional amount of memory is available from unallocated system memory; and
 allocating, at runtime, an amount of memory to the hypervisor to satisfy the additional amount of memory required to store the I/O translation table.

18. The computer program product of claim 15, wherein the computer program instructions further cause the computer to carry out the steps of:
- instantiating, at runtime, the I/O translation table using the allocated memory from a hypervisor; and
- providing, to the multiple logical partitions, access to the SR-IOV adapter using the I/O translation table stored in the allocated memory from the hypervisor.

19. The computer program product of claim 15, wherein receiving the instruction to transition the SR-IOV adapter to shared mode comprises receiving an instruction to transition the SR-IOV adapter from dedicated to shared mode, wherein the SR-IOV adapter in dedicated mode provides, to a single entity, access to the SR-IOV adapter.

20. The computer program product of claim 15, wherein determining, using the configuration file for the SR-IOV adapter, the amount of memory that will be required for storing the I/O translation table comprises retrieving the configuration file via a service processor.

* * * * *